US008074205B2

(12) United States Patent
Shastry et al.

(10) Patent No.: US 8,074,205 B2
(45) Date of Patent: Dec. 6, 2011

(54) BINARY VERIFICATION SERVICE

(75) Inventors: Shankara M. C. Shastry, Bangalore (IN); Perraju Bendapudi, Hyderabad (IN); Narayanan Ganapathy, Redmond, WA (US); Vladimir A. Levin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1148 days.

(21) Appl. No.: 11/736,935

(22) Filed: Apr. 18, 2007

(65) Prior Publication Data

US 2008/0258865 A1 Oct. 23, 2008

(51) Int. Cl.
*G06F 9/44* (2006.01)
(52) U.S. Cl. ........................................ 717/126; 717/124
(58) Field of Classification Search ........................ None
See application file for complete search history.

(56) References Cited

U.S. PATENT DOCUMENTS

| | | | | |
|---|---|---|---|---|
| 5,313,616 | A  * | 5/1994 | Cline et al. | 717/127 |
| 6,035,107 | A | 3/2000 | Kuehlmann et al. | |
| 6,317,868 | B1 | 11/2001 | Grimm et al. | |
| 6,763,517 | B2 * | 7/2004 | Hines | 717/124 |
| 6,862,696 | B1 * | 3/2005 | Voas et al. | 714/38 |
| 7,062,650 | B2 | 6/2006 | Robbins et al. | |
| 7,089,552 | B2 | 8/2006 | Attalah | |
| 7,111,307 | B1 | 9/2006 | Wang | |
| 7,150,008 | B2 * | 12/2006 | Cwalina et al. | 717/126 |
| 7,231,635 | B2 * | 6/2007 | Schwabe | 717/126 |
| 7,487,545 | B2 * | 2/2009 | Hall et al. | 726/25 |
| 7,814,465 | B2 * | 10/2010 | Liu | 717/126 |
| 2001/0037438 | A1 | 11/2001 | Mathis | |
| 2004/0083464 | A1 * | 4/2004 | Cwalina et al. | 717/141 |
| 2005/0251857 | A1 | 11/2005 | Schunter et al. | |
| 2006/0052886 | A1 * | 3/2006 | Lydon et al. | 700/91 |
| 2006/0100010 | A1 * | 5/2006 | Gatto et al. | 463/29 |
| 2006/0236114 | A1 * | 10/2006 | Yamamoto et al. | 713/176 |
| 2007/0266373 | A1 * | 11/2007 | Liu | 717/126 |
| 2008/0168477 | A1 * | 7/2008 | Flegg et al. | 719/327 |
| 2008/0258865 | A1 * | 10/2008 | Shastry et al. | 340/5.21 |

OTHER PUBLICATIONS

Microsoft Corporation "Driver Verifier in Windows Vista", Oct. 26, 2006.
Michael F. Spear et al. "Solving the Starting Problem: Device Drivers as Self-Describing Artifacts", EuroSys 2006, Apr. 18-21, 2006, Belgium, © 2006 ACM.
Sagar Chaki "From Finding Bugs to Certifying their Absence", Sep. 21 , 2006.
Thomas Ball et al. "The Slam Project: Debugging System Software via Static Analysis", POPL '02, Jan. 16-18, 2002 Portland, OR, USA, © 2002 ACM.
Thomas Ball et al. "Thorough Static Analysis of Device Drivers", EuroSys 2006, Apr. 18-21, 2006, Belgium, © 2006 ACM.
Thomas Ball et al. "SLAM and Static Driver Verifier: Technology Transfer of Formal Methods inside Microsoft", Technical Report MSR-TR-2004-08, Jan. 28, 2004.
Microsoft Corporation "Introducing Static Driver Verifier n Windows Vista", May 5, 2006.
International Search Report from the Korean Intellectual Property Office regarding PCT/US2008/056542 dated Jun. 26, 2008, 12 pages.
Office Action from the Patent Office of the State Intellectual Property Office of the People's Republic of China regarding Application No. 200880012516.0 dated May 25, 2011.

* cited by examiner

*Primary Examiner* — Li Zhen
*Assistant Examiner* — Marina Lee

(57) ABSTRACT

A binary is received at a binary verification service from a binary verification client agent. The binary verification service performs binary verification of the binary, wherein binary verification includes determining whether the binary is complicit with a set of usage rules. The binary verification service sends a binary verification result to the binary verification client agent.

20 Claims, 6 Drawing Sheets

BINARY VERIFICATION SERVICE

BACKGROUND

Software quality is of paramount importance especially in the context of security and reliability. There are tools that may be run on source code as part of the development process that check for a variety of common bugs or vulnerabilities as well as verify the source code's compliance with certain rules. Source code may also be tested to ensure that the source code does not have serious security problems such as buffer overflow. However, in any software system or product, the content that's actually shipped to the customer is the raw bits (referred to as a binary) of different executables that comprise the product. Today's systems for providing binary verification are inadequate.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention are directed to a binary verification service. The binary verification service may determine whether a binary follows one or more sets of usage rules and score the binary accordingly. In one example scenario, the binary verification service may check the quality of a binary before installation on a system. In another example scenario, a programmer may use the binary verification service as part of software development of a product.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Figure 1:
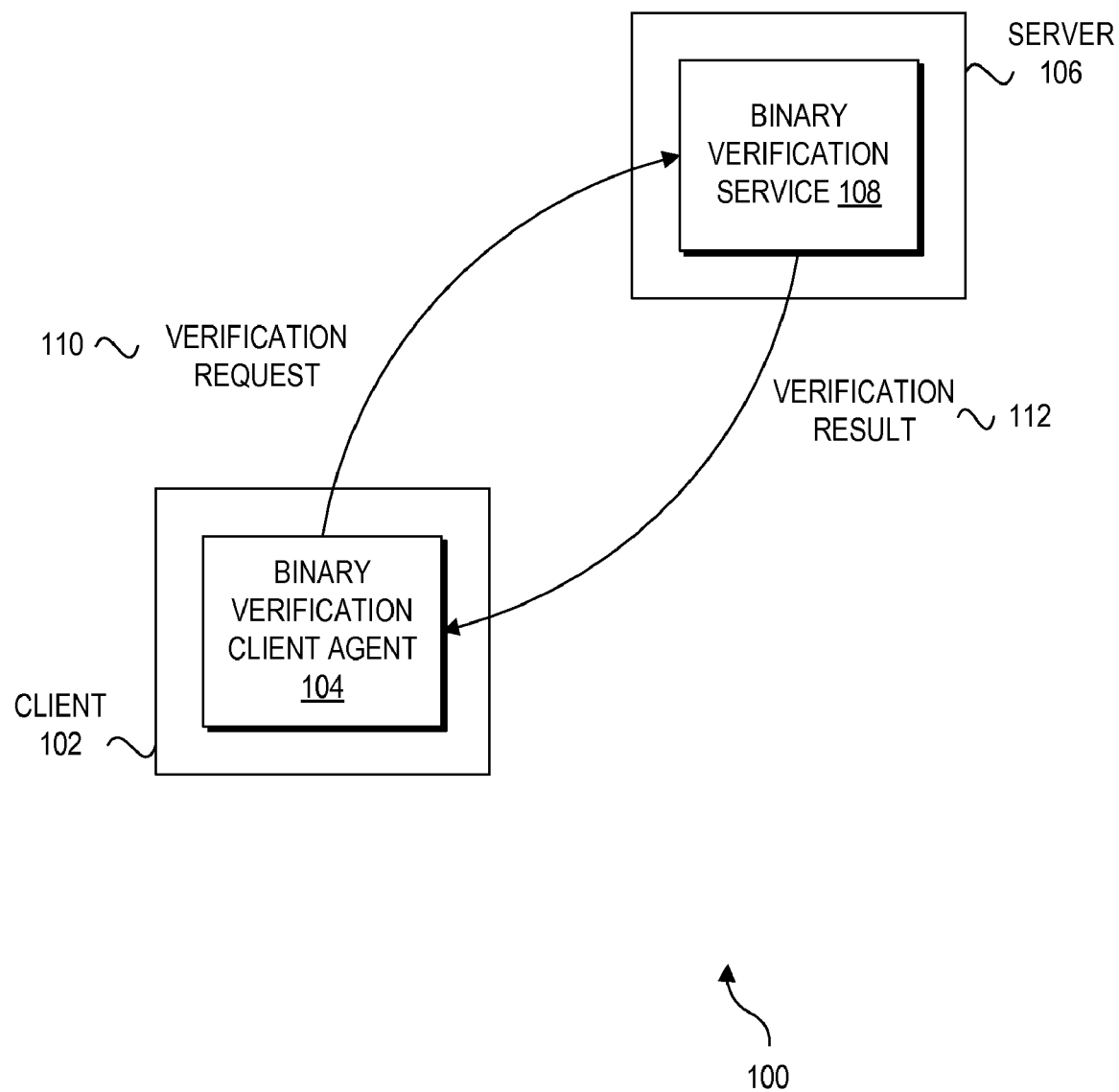
FIG. 1 is a block diagram of a binary verification system in accordance with an embodiment of the invention.

FIG. 1 shows a binary verification system 100 in accordance with an embodiment of the invention. System 100 includes a client 102 that may communicate with a server 106. Client 102 may connect to server 106 using a network (not shown), such as an intranet, internet, or any combination thereof. One client 102 is shown for the sake of clarity, but it will be understood that multiple clients 102 may connect to server 106 seeking binary verification services. Client 102 and/or server 106 may be implemented as a computing device as described below in connection with FIG. 6.

Client 102 includes a binary verification client agent 104 for communicating with a binary verification service 108 on server 106. Client agent 104 may be used to verify a binary for a user at client 102. For example, a user downloads a device driver for installation on client 102. However, before installing the device driver on client 102, the user may use client agent 104 to verify the device driver binary. In this way, the user can test whether the device driver is complicit with usage rules for the client operating system before installing the device driver and possibly crippling client 102 with a poorly written driver.

As used herein, a "binary" refers to executable machine code. As used herein, "binary verification" refers to analyzing a binary to determine whether the binary is complicit with a set of usage rules. The usage rules define programming techniques that should be followed in order to minimize any disruption the binary may cause to the environment the binary is executed in. In other words, the usage rules define proper interaction between the binary and the binary's operating environment, such as an operating system. For example, a device driver binary may be checked to ensure that the device driver binary conforms to Device Driver Interface rules (e.g., a Microsoft Windows® Driver Development Kit (DDK), etc.). The binary verification may validate behavior of a device driver binary and find defects in the binary's usage of kernel APIs. In another example, a user mode binary may be verified against Applicant Programming Interface (API) rules (e.g., Microsoft Win32® API). API usage rules may address a variety of areas including locking properties, interrupt request calls, plug-and-play, power management, and the like. Example usage rules verify the ranges of parameters to an API call, verify the calling of APIs in a particular order, and the like.

In system 100, server 106 includes binary verification service 108. While only one server 106 is shown, it will be appreciated that binary verification service 108 may be supported by two or more servers. Binary verification service 108 may receive a binary verification request 110 to perform binary verification of a binary from client agent 104. Binary verification service 108 returns binary verification result 112 for the requested binary to client agent 104. Binary verification result 112 may include a verification score for the binary (e.g., a grade of A to F, a scaled score of 1 to 10, etc.) that indicate how complicit the binary is with a set of usage rules. In one embodiment, the binary verification does not have to be sound or complete (i.e., the verification may find some false positives or may miss some usage rule violations).

Client agent 104 may then present the verification result to a user at client 102. The user may use the verification result to determine if the binary is to be installed and/or executed. In another instance, the user may include a programmer who uses verification result 112 for developing a software program.

Figure 2:
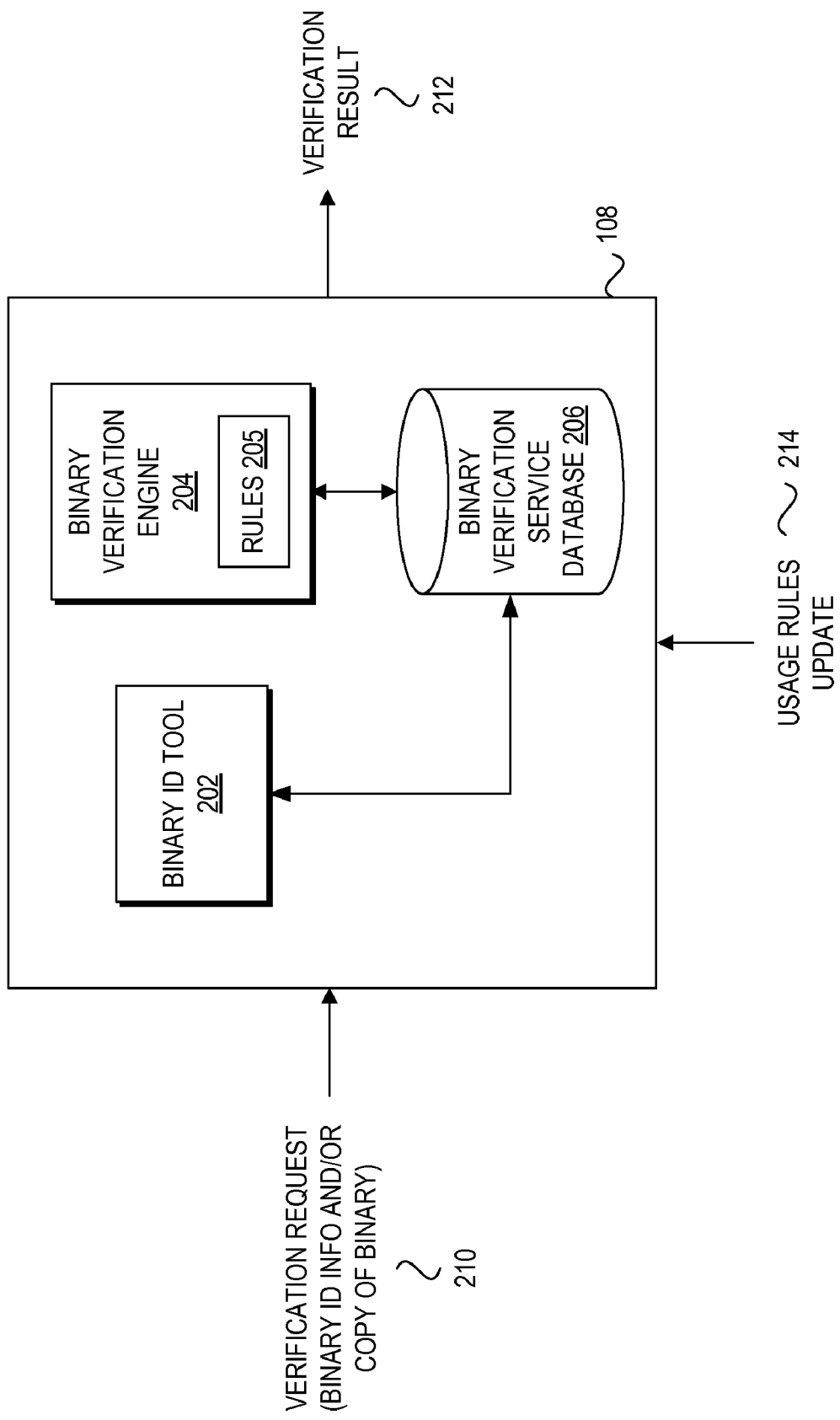
FIG. 2 is a block diagram of a binary verification service in accordance with an embodiment of the invention.

Turning to FIG. 2, an embodiment of binary verification service 108 is shown. Service 108 may include a binary identification (ID) tool 202, a binary verification engine 204, and a binary verification service database 206. In one embodiment, service 108 may be implemented as computer readable instructions executable by one or more servers 106.

A binary verification request 210 is received at service 108. Request 210 may include binary identification information to uniquely identify a binary. For example, a driver binary may be digitally signed and have a unique identification for the driver and the driver's version.

When binary ID information is received at service 108, binary ID tool 202 may search database 206 to determine if the binary has already been verified. If the binary has been previously verified, then the binary verification result 212 for the binary is sent to the requesting client agent. If the binary has not been previously verified, then service 108 may request a copy of the binary from the client agent. Alternatively, the original binary verification request may include the binary ID information as well as the binary itself.

Binary verification engine 204 checks the binary against a set of usage rules 205. Service 108 may perform static verification (verify the binary without executing the binary) and/or dynamic verification (instrument the binary and then examine the binary while the binary is executing). Binary verification engine 204 may include two or more sets of usage rules 205. The appropriate set(s) of usage rules 205 may be applied to a binary as appropriate for the binary. For example, a device driver binary for Microsoft Windows Vista™ may be tested with a different set of usage rules than an application plug-in for a browser, such as Microsoft Internet Explorer. Binary verification engine 204 may include binary verification engines such as Microsoft Error Detection via Scalable Program Analysis (ESP) and Microsoft Static Driver Verifier (SDV) (which uses the SLAM analysis engine).

After verification by the binary verification engine 204, the verification result may be saved in service database 206. In this way, if verification of the binary is requested again, service 108 may provide verification results from service database 206 instead of having to re-verify the same binary. The binary itself may also be saved in service database 206 along with the binary's verification result.

Service 108 sends binary verification result 212 to the requesting client agent. In one embodiment, the verification result may include a graded scale indicating how closely the binary followed the usage rules. For example, the binary may be rated a grade of "A" (follows nearly all rules) to "F" (follows almost no rules), or a scale of 10 (follows nearly all rules) to 1 (follows almost no rules), or the like. In another embodiment, the verification result may indicate that the results for one or more usage rules; these individual results may include pass, fail, or inconclusive for each usage rule. In yet another embodiment, the verification result may indicate which set(s) of usage rules were used to test the binary.

Service 108 may also receive a usage rules update 214. Usage rules update 214 may include a revision to an existing usage rule or a new usage rule. In one embodiment, one or more binaries stored in service database 206 may be re-verified in response to a usage rules update received at service 108 (discussed further below).

Figure 3:
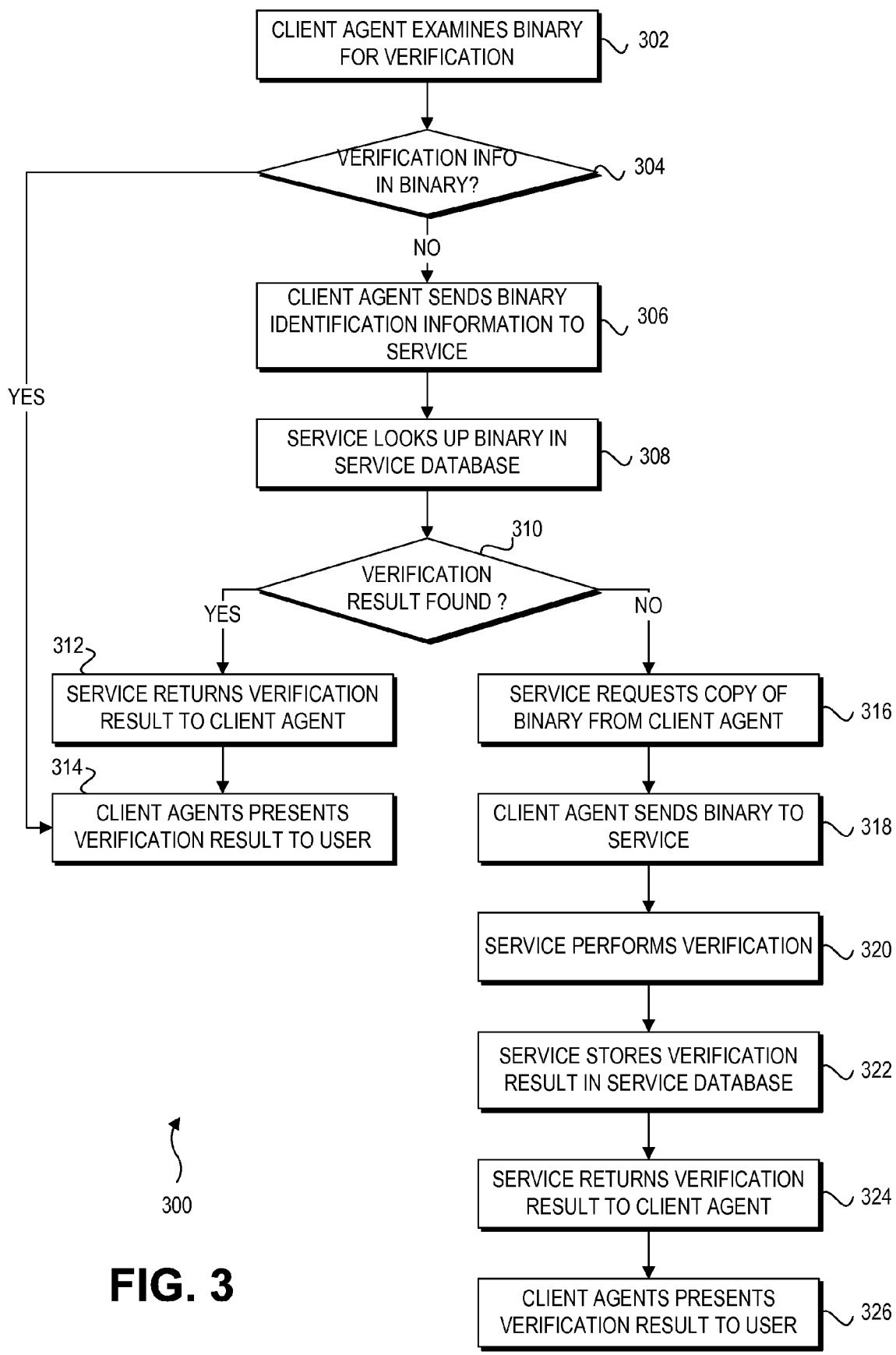
FIG. 3 is a flowchart showing the logic and operations of a binary verification service in accordance with an embodiment of the invention.

Turning to FIG. 3, a flowchart 300 shows the logic and operations of binary verification in accordance with an embodiment of the invention. In one embodiment, at least a portion of the logic of flowchart 300 may be implemented by computer readable instructions executable by one or more computing devices.

Starting in block 302, a client agent examines one or more binaries for verification. The client agent may gather binary identification information about a binary that uniquely identifies the binary. A binary may also have an electronic signature that indicates that the binary has already been verified and/or the verification result. In one embodiment, the client agent examines a binary in response to a user input. For example, a user downloads a new device driver for client 102. The user may be presented with a command box by client agent 104 offering to verify the new device driver before installation of the new device driver. In another example, a user may request that client agent 104 automatically verify new binaries and/or periodically check for verification updates to previously verified binaries.

Next, in decision block 304, the logic determines if verification information is included in the binary, such as in an electronic signature. If the answer to decision block 304 is yes, then the logic proceeds to block 314 to present the verification result included in the binary itself to the user. The user may also be presented with the option to re-verify the binary with service 108. In this way, the user may feel confident that the binary has been verified with the latest usage rules.

If the answer to decision block 304 is no, then the logic proceeds to block 306. In block 306, the client agent sends the binary identification information gathered previously to a binary verification service.

Continuing to block 308, the binary verification service uses the binary identification information to look up the binary in a service database. It will be appreciated that the service database may include several databases at one physical location and/or several databases at different physical locations but interconnected, such as by a network.

Next, in decision block 310, the logic determines if a binary verification result for the binary is stored in the service database. If the answer to decision block 310 is yes, then the logic proceeds to block 312.

In block 312, the binary verification service returns the verification result for the binary to the client agent. Next, in block 314, the client agent presents the verification result to the user. In one example, the user may use the verification result to determine whether to install a new device driver on their system.

If the answer to decision block 310 is no, then the logic proceeds to block 316. In block 316, the service requests a copy of the binary from the client agent. Proceeding to block 318, the client sends the binary for verification to the service. Next, in block 320, the service verifies the binary.

Proceeding to block 322, the service stores the verification result in the service database. This way, when the service is requested to verify the same binary again (from the current client agent or another client agent), then the service may refer to the saved verification result instead of having to re-verify the same binary. In one embodiment, a copy of the binary itself may also be stored in the service database. As discussed further below, a binary stored at the service may be re-verified after the binary verification usage rules at the service have been updated.

Continuing to block 324, the service returns the verification result to the client agent. Next, in block 326, the verification result is presented to the user by the client agent.

Figure 4:
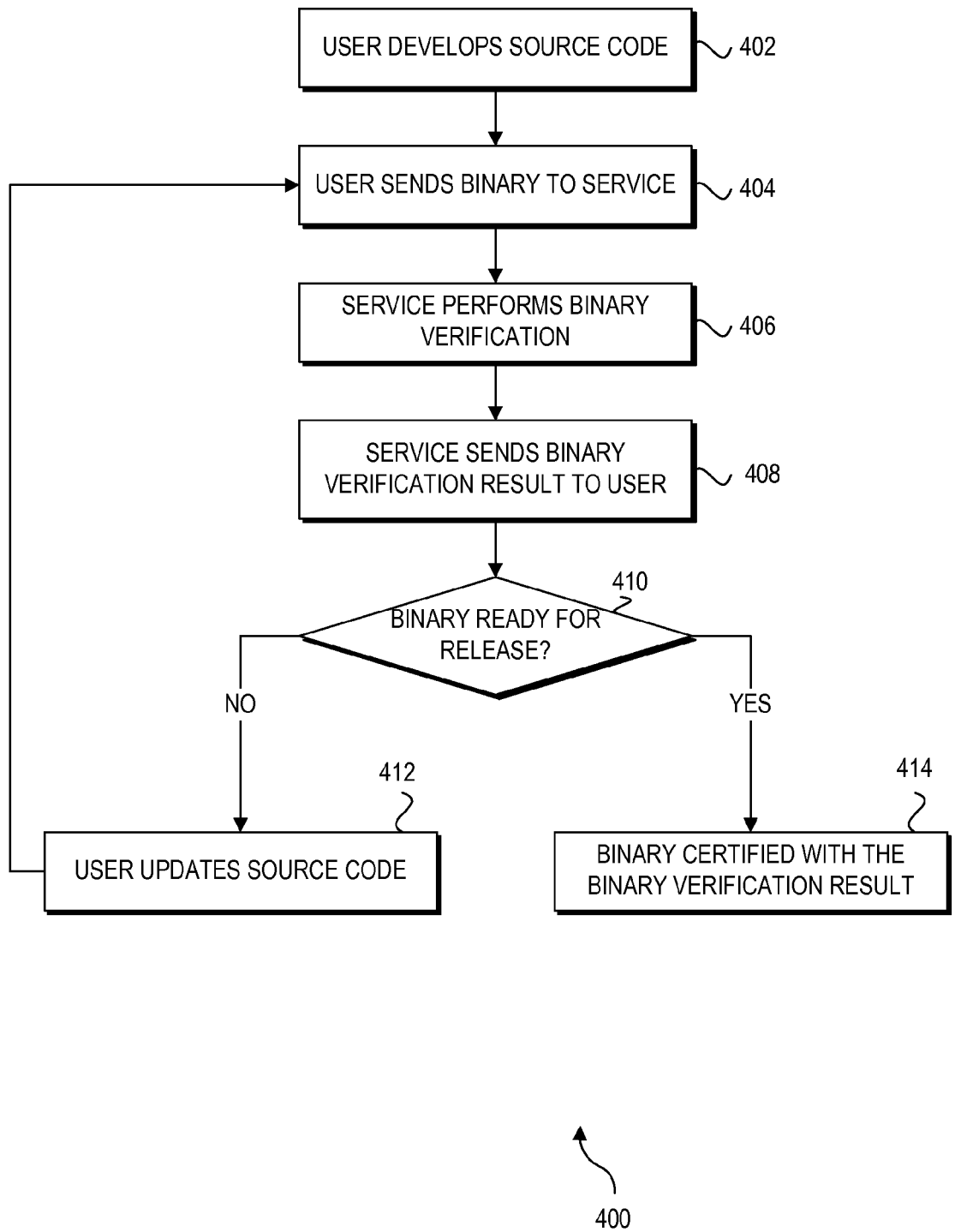
FIG. 4 is a flowchart showing the logic and operations using a binary verification service during software development in accordance with an embodiment of the invention.

Turning to FIG. 4, a flowchart 400 shows the logic and operations of binary verification during software development using a binary verification service in accordance with an embodiment of the invention. In one embodiment, at least a portion of the logic of flowchart 400 may be implemented by computer readable instructions executable by one or more computing devices.

Starting in block 402, a user develops source code. The user may include a programmer, software developer, a vendor, or the like. Next, in block 404, the user compiles the source code and sends the resulting binary to a binary verification service using a binary verification client agent. Continuing to block 406, the service performs binary verification on the binary. The service then sends the binary verification result back to the user, as shown in block 408.

The logic proceeds to decision block 410 where the determination is made whether the binary is ready for release based at least in part on the received verification result. If the answer to decision block 410 is no, then the logic proceeds to block 412 where the user makes updates to the source code to attempt to get the code to comply with more of the usage rules and thus improve the verification result. After block 412, the logic returns to block 404 where the user sends a binary corresponding to the updated source code to the service.

If the answer to decision block 410 is yes, then the logic proceeds to block 414. In block 414, the binary may be certified with the received binary verification result. The binary may be electronically signed indicating that the binary has been verified by the service. At least a portion of the verification result may also be included with the binary so the verification result may be reviewed by users before installing and/or executing the binary.

Figure 5:
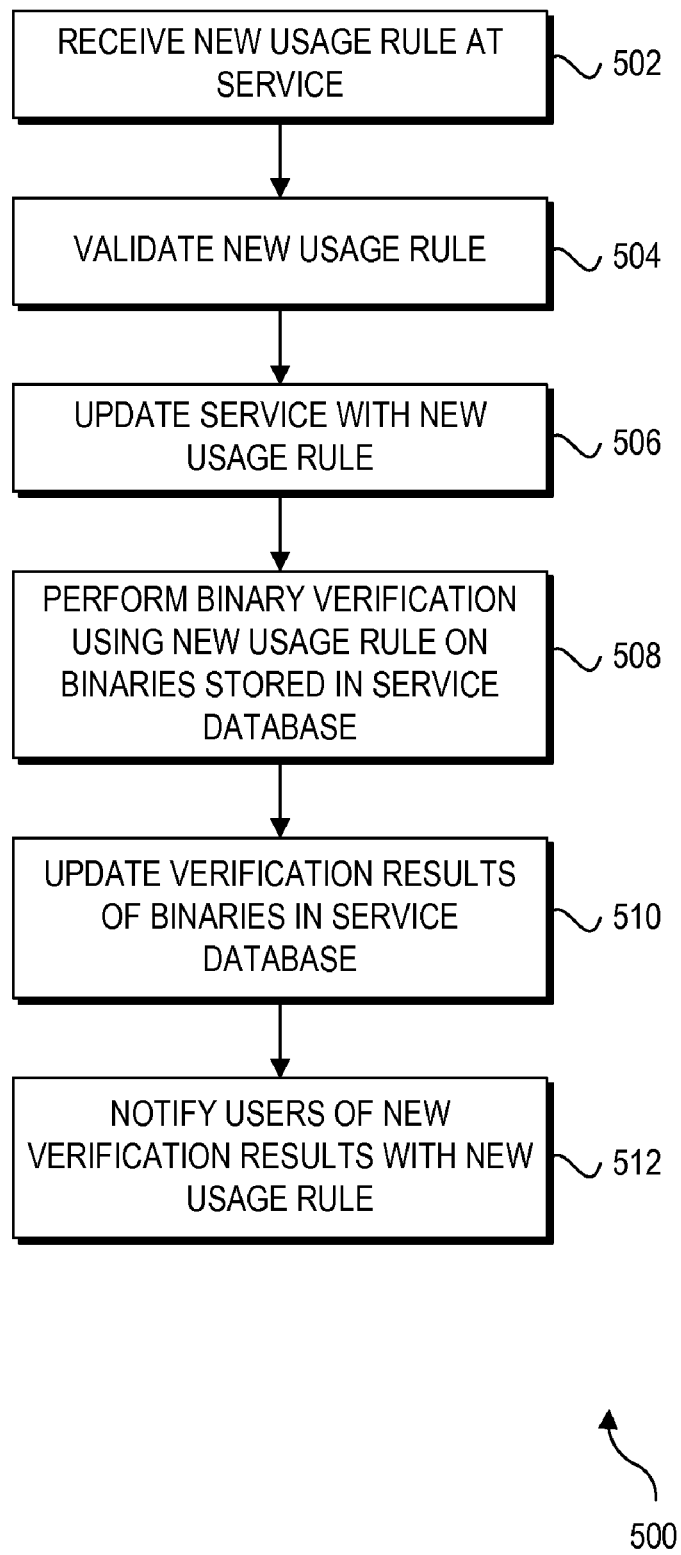
FIG. 5 is a flowchart showing the logic and operations of updating usage rules of a binary verification service in accordance with an embodiment of the invention.

Turning to FIG. 5, a flowchart 500 shows the logic and operations of updating usage rules of a binary verification service in accordance with an embodiment of the invention. In one embodiment, at least a portion of the logic of flowchart 500 may be implemented by computer readable instructions executable by one or more computing devices.

Starting in block 502, a new usage rule is received at a binary verification service. A new rule may include a revision to an existing usage rule at the service. Proceeding to block 504, the new usage rule is validated. The new usage rule may be validated by the platform provider (e.g., validated by the Microsoft Corporation in the case of Microsoft Windows®). The new usage rule may also be validated by a computing community discussion forum (such as on a web discussion board), standards board, or other group.

Next, in block 506, if the new usage rule is validated, then the binary verification service is updated with the new usage rule. In one instance, the new usage rule is added to one or more set of usage rules as appropriate. For example, a new usage rule pertinent to device drives is added to one or more sets of usage rules used to verify device drivers.

Proceeding to block 508, binary verification is performed on at least a portion of the binaries stored in the service database using the new usage rule. Continuing to block 510, the verification results of the binaries stored at the service are updated as a result of the new usage rule.

Proceeding to block 512, one or more users are notified by the service of new verification results to their binaries. In the case of a software developer, the updated verification result may be used to re-code a product (e.g., a device driver), re-verify, and re-certify the product. The software developer may then make customers aware of the updated product. In another example, updated verification results may be pushed to users, such as through Microsoft Windows® Update, to automatically alert users about new verification results. This may improve the reliability and stability of client systems and thus improve the user experience.

Embodiments of the invention provide a binary verification service. Performing binary verification on client machines is impractical due to the complexity and computational intensity of binary verification. Also, in client binary verification, end users are burdened with downloading updated usage rules to the client. A binary verification service provides a centralized location for end users as well as software developers to verify a binary against the latest usage rules. A binary verification service also allows a platform vendor to ensure quality and robustness of the platform in the presence of various applications, developed by independent vendors, running on its platform.

Figure 6:
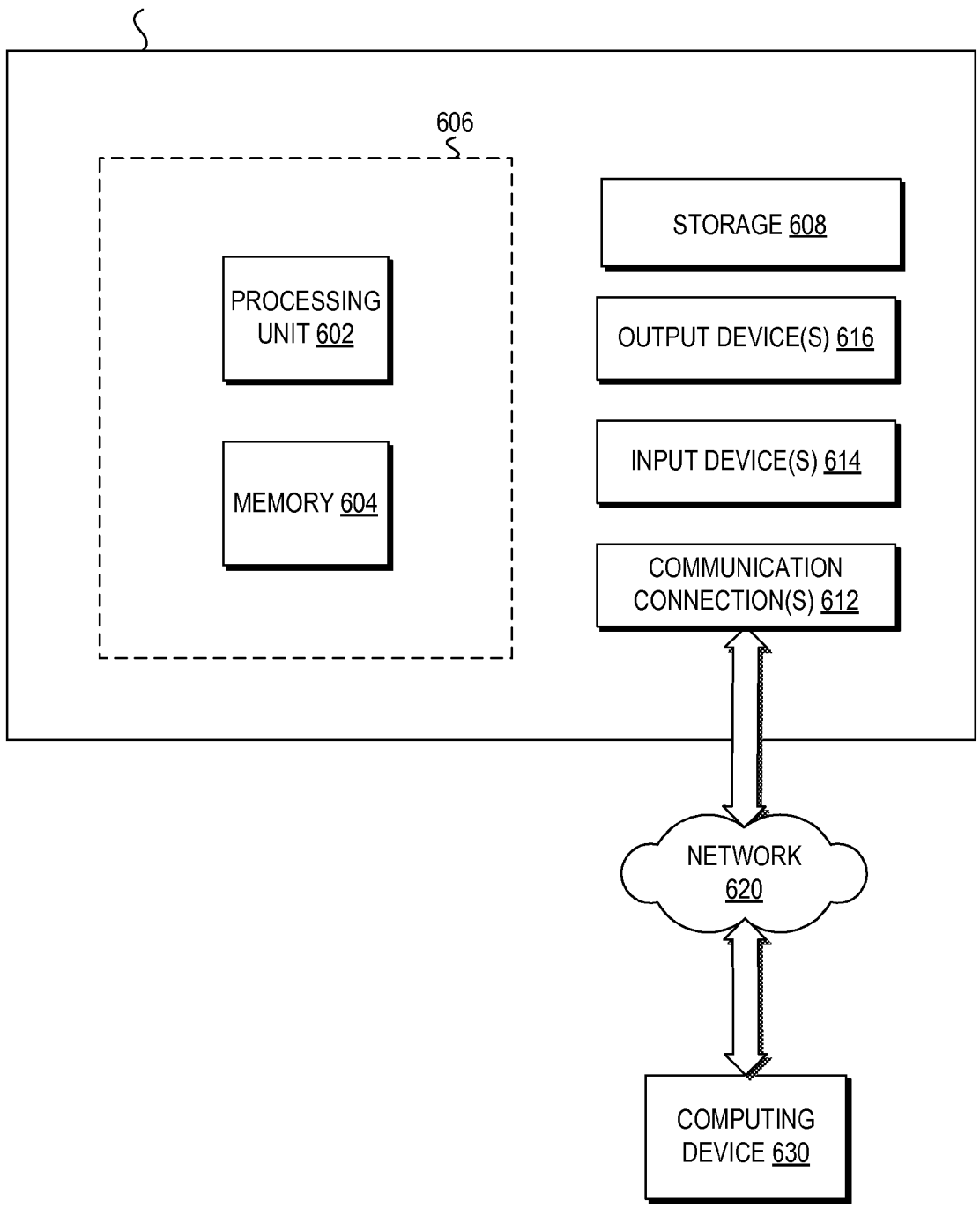
FIG. 6 is a block diagram of an example computing device for implementing embodiments of the invention.

FIG. 6 and the following discussion are intended to provide a brief, general description of a suitable computing environment to implement embodiments of the invention. The operating environment of FIG. 6 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 shows an example of a computing device 600 for implementing one or more embodiments of the invention. In one configuration, computing device 600 includes at least one processing unit 602 and memory 604. Depending on the exact configuration and type of computing device, memory 604 may be volatile (such as RAM), non-volatile (such as ROM, flash memory, etc.) or some combination of the two. This configuration is illustrated in FIG. 6 by dashed line 606.

In other embodiments, device 600 may include additional features and/or functionality. For example, device 600 may also include additional storage (e.g., removable and/or non-removable) including, but not limited to, magnetic storage, optical storage, and the like. Such additional storage is illustrated in FIG. 6 by storage 608. In one embodiment, computer readable instructions to implement embodiments of the invention may be in storage 608. Storage 608 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 604 and storage 608 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 600. Any such computer storage media may be part of device 600.

Device 600 may also include communication connection(s) 612 that allow device 600 to communicate with other devices. Communication connection(s) 612 may include, but is not limited to, a modem, a Network Interface Card (NIC), an integrated network interface, a radio frequency transmitter/receiver, an infrared port, a USB connection, or other interfaces for connecting computing device 600 to other computing devices. Communication connection(s) 612 may include a wired connection or a wireless connection. Communication connection(s) 612 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, Near Field Communication (NFC), and other wireless media.

Device 600 may include input device(s) 614 such as keyboard, mouse, pen, voice input device, touch input device, infrared cameras, video input devices, and/or any other input device. Output device(s) 616 such as one or more displays, speakers, printers, and/or any other output device may also be included in device 600. Input device(s) 614 and output device(s) 616 may be connected to device 600 via a wired connection, wireless connection, or any combination thereof. In one embodiment, an input device or an output device from another computing device may be used as input device(s) 614 or output device(s) 616 for computing device 600.

Components of computing device 600 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 600 may be interconnected by a network. For example, memory 604 may be comprised of multiple physical memory units located in different physical locations interconnected by a network.

In the description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other (for example, communicatively coupled).

Those skilled in the art will realize that storage devices utilized to store computer readable instructions may be distributed across a network. For example, a computing device 630 accessible via network 620 may store computer readable instructions to implement one or more embodiments of the invention. Computing device 600 may access computing device 630 and download a part or all of the computer readable instructions for execution. Alternatively, computing device 600 may download pieces of the computer readable instructions, as needed, or some instructions may be executed at computing device 600 and some at computing device 630. Those skilled in the art will also realize that all or a portion of the computer readable instructions may be carried out by a dedicated circuit, such as a Digital Signal Processor (DSP), programmable logic array, and the like.

Various operations of embodiments of the present invention are described herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
   receiving, at a binary verification service on a server, a binary sent over a network from a binary verification client agent on a computing device of a user;
   performing, by the binary verification service, binary verification of the binary, wherein binary verification includes determining whether the binary is complicit with a set of usage rules applied to the binary;
   storing, by the binary verification service, the binary and a binary verification result in a binary verification service database, the binary verification result indicating whether the binary follows all usage rules of the set of usage rules and including a grade indicating how closely the binary followed the set of usage rules when the binary does not follow all of the usage rules of the set of usage rules;
   sending, by a binary verification service, the binary verification result over the network to the binary verification client agent for presenting the binary verification result to the user prior to installation of the binary on the computing device of the user;
   receiving, at the binary verification service, a usage rule update including a revision to an existing rule of the set of usage rules or a new usage rule for the set of usage rules;
   validating the usage rule update;
   performing, by the binary verification service, re-verification of the binary using the usage rule update;
   storing, by the binary verification service, an updated binary verification result for the binary in the binary verification service database; and
   pushing, by the binary verification service, the updated verification result over the network to the binary verification client agent to automatically alert the user about the updated verification result for the binary.

2. The method of claim 1, further comprising:
   receiving, by the binary verification service, binary identification information associated with the binary from the binary verification client agent.

3. The method of claim 1, further comprising:
receiving, at the binary verification service, binary identification information associated with the binary sent over the network from a second binary verification client agent;
looking up, by the binary verification service, the binary verification result for the binary in the binary verification service database using the binary identification information; and
sending, by the binary verification service, the binary verification result found in the binary verification service database that corresponds to the binary identification information over the network to the second binary verification client agent.

4. The method of claim 1, further comprising:
receiving, at the binary verification service, a new usage rule for the set of usage rules; and
updating, by the binary verification service, the set of usage rules with the new usage rule.

5. The method of claim 4, further comprising
performing, by the binary verification service, re-verification of a plurality of binaries stored in a binary verification service database using the new usage rule; and
storing, by the binary verification service, updated binary verification results corresponding to the plurality of binaries stored in the binary verification service database.

6. The method of claim 5, further comprising:
notifying, by the binary verification service, a plurality of binary verification client agents of the updated verification results.

7. The method of claim 1, wherein the binary verification result includes a letter or number grade for the binary.

8. One or more computer readable storage media including computer readable instructions executed by the server to perform the method of claim 1.

9. A method, comprising:
sending, by a binary verification client agent on a computing device of a user, a binary over a network to a binary verification service on a server, the binary verification service configured to determine whether the binary is complicit with a set of usage rules applied to the binary;
receiving, at the binary verification client agent, a binary verification result for the binary over the network from the binary verification service;
presenting the verification result to the user prior to installation of the binary on the computing device of the user, the binary verification result indicating whether the binary follows all usage rules of the set of usage rules and including a grade indicating how closely the binary followed the set of usage rules when the binary does not follow all of the usage rules of the set of usage rules;
installing the binary on the computing device of the user; and
receiving an updated verification result sent by the binary verification service to the binary verification client agent over the network, the updated verification result pushed to the binary verification client agent in response to the binary verification service receiving a usage rule update including a revision to an existing rule of the set of usage rules or a new usage rule for the set of usage rules, validating the usage rule update, and re-verifying the binary using the usage rule update; and
automatically alerting the user about the updated verification result for the binary.

10. The method of claim 9, further comprising:
selecting, at the binary verification client agent, the binary for verification based at least in part on user input downloading the binary to the computing device.

11. The method of claim 9, further comprising:
sending, by the binary verification client agent, binary identification information associated with the binary to the binary verification service; and
receiving a request for the binary from the binary verification service in response to the binary verification service determining that the binary has not been previously verified.

12. The method of claim 9, further comprising:
presenting, by the binary verification client agent, binary verification updates to a plurality of previously verified binaries.

13. The method of claim 9, further comprising:
re-coding the binary according to a new rule based on the updated verification result which was sent by the binary verification service in response to the usage rule update.

14. One or more computer readable storage media including computer readable instructions executed by the computing device of the user to perform the method of claim 9.

15. A computer system, comprising:
a processing unit for executing computer readable instructions;
a binary verification service database; and
memory storing computer readable instructions for implementing a binary verification service configured to communicate over a network with a binary verification client agent on a computing device of a user, the binary verification service to:
receive a binary sent over the network from the binary verification client agent;
determine whether the binary is complicit with a set of usage rules applied to the binary;
store the binary and a binary verification result in the binary verification service database, the binary verification result indicating whether the binary follows all usage rules of the set of usage rules and including a grade indicating how closely the binary followed the set of usage rules when the binary does not follow all of the usage rules of the set of usage rules;
send the binary verification result for the binary over the network to the binary verification client agent for presenting the binary verification result to the user prior to installation of the binary on the computing device of the user;
receive a usage rule update including a revision to an existing rule of the set of usage rules or a new usage rule for the set of usage rules;
validate the usage rule update;
perform re-verification of the binary using the usage rule update;
store an updated binary verification result for the binary in the binary verification service database; and
push the updated verification result over the network to the binary verification client agent to automatically alert the user about the updated verification result for the binary.

16. The system of claim 15, wherein the binary verification service is further configured to:
receive binary identification information associated with the binary sent over the network from a second binary verification client agent;

look up the binary verification result for the binary from the binary verification service database using binary identification information; and send the binary verification result found in the binary verification service database that corresponds to the binary identification information over the network to the second binary verification client agent.

17. The system of claim 15, wherein the binary verification service sends a request for the binary in response to the binary verification service determining that the binary has not been previously verified.

18. The system of claim 17, wherein the binary verification service receives binary identification information associated with the binary and searches for a stored binary verification result for the binary in the binary verification service database using the binary identification information.

19. The system of claim 15, wherein the binary verification service receives a new usage rule for the set of usage rules and updates the set of usage rules with the new usage rule.

20. The system of claim 19, wherein the binary verification service:

performs re-verification of a plurality of binaries stored in a binary verification service database using the new usage rule;

stores updated binary verification results corresponding to the plurality of binaries stored in the binary verification service database; and notifies a plurality of binary verification client agents of the updated binary verification results.

* * * * *